United States Patent
Fischer et al.

(10) Patent No.: US 8,197,248 B2
(45) Date of Patent: Jun. 12, 2012

(54) METHOD FOR THE SELECTIVE SAFETY-RELATED MONITORING OF ENTRAINED-FLOW GASIFICATION REACTORS

(75) Inventors: Norbert Fischer, Lichtenberg (DE); Bernd Holle, Freiberg (DE); Manfred Schingnitz, Freiberg (DE)

(73) Assignee: Siemens Aktiengesellschaft, Munich (DE)

( * ) Notice: Subject to any disclaimer, the term of this patent is extended or adjusted under 35 U.S.C. 154(b) by 994 days.

(21) Appl. No.: 12/220,131

(22) Filed: Jul. 22, 2008

(65) Prior Publication Data
US 2009/0029299 A1 Jan. 29, 2009

(30) Foreign Application Priority Data
Jul. 26, 2007 (DE) .......................... 10 2007 034 950

(51) Int. Cl.
*F23N 5/20* (2006.01)
*A01G 13/06* (2006.01)
*C10J 3/46* (2006.01)
(52) U.S. Cl. ............................. 431/6; 431/18; 48/197 R
(58) Field of Classification Search ................ 431/6, 18; 48/197 R
See application file for complete search history.

(56) References Cited

U.S. PATENT DOCUMENTS

| | | | | |
|---|---|---|---|---|
| 4,113,445 A | * | 9/1978 | Gettert et al. | 48/197 R |
| 4,353,712 A | * | 10/1982 | Marion et al. | 48/197 R |
| 5,718,256 A | * | 2/1998 | Buezis et al. | 137/66 |
| 2007/0079554 A1 | * | 4/2007 | Schingnitz et al. | 48/210 |

FOREIGN PATENT DOCUMENTS

| | | | |
|---|---|---|---|
| DE | 278 692 A3 | | 5/1990 |
| DE | 4025808 A1 | * | 1/1991 |
| DE | 300 200 A7 | | 5/1992 |
| DE | 10 2005 048 488 A1 | | 5/2007 |
| DE | 10 2006 030 079 A1 | | 1/2008 |

* cited by examiner

*Primary Examiner* — Kenneth Rinehart
*Assistant Examiner* — William Corboy

(57) ABSTRACT

While ensuring technical safety and a short start-up time the invention permits the operation of autothermic partial oxidation of fuels processed into pulverized fuel such as lignite and bituminous coals, petroleum cokes, solid grindable carbon-containing residues, as well as solid-liquid suspensions or slurries, with a gasification agent containing oxygen at operating pressures of up to 8 MPa (80 bar). The selective configuration of the fail-safe monitoring of the gasification process only the supply of the main fuel is cut off. Through the continued operation of the pilot and ignition burner the reactor is kept at operating pressure and after the fault has been rectified fuel gasification can be restarted with the pilot and ignition burner without a complicated placement and pulling of a starter burner and subsequent pressurization of the reactors.

12 Claims, 2 Drawing Sheets

ମETHOD FOR THE SELECTIVE SAFETY-RELATED MONITORING OF ENTRAINED-FLOW GASIFICATION REACTORS

CROSS REFERENCE TO RELATED APPLICATIONS

This application claims priority of German application No. 10 2007 034 950.7 DE filed Jul. 26, 2007, which is incorporated by reference herein in its entirety.

FIELD OF INVENTION

The subject matter of the application is 1.) a method for the selective safety-related monitoring of high-power entrained-flow gasification reactors with a single- or multi-burner arrangement for the autothermic partial oxidation of fuels processed into pulverized fuel such as lignite and bituminous coals, petroleum cokes, solid grindable carbon-containing residues, as well as solid-liquid suspensions or slurries, with a gasification agent containing oxygen at operating pressures of up to 80 bar and 2.) a method for controlling an entrained-flow gasification reactor.

The invention relates to a method for the selective safety-related monitoring of entrained-flow gasification reactors with an output of up to 1500 MW, as can be used for the synthesis gas supply of large-scale synthesis processes or to provide fuel gas for IGCC (Integrated Gasification Combined Cycle) processes.

BACKGROUND OF INVENTION

According to the current prior art for ceramically lined reactors a heating burner is used to preheat the ceramic lining for ignition of the fuel burners to temperatures>ignition temperature of the fuel and, after the heating burner has been dismantled, the fuel burner is started using the ignition potential of the ceramic lining. Ignition usually takes place at pressures of up to 1.0 MPa.

SUMMARY OF INVENTION

In reactors with a cooled reaction chamber contour the fuel burners are ignited by means of a starter burner, which for this purpose has to be placed on the reactors. Ignition is known at pressures of up to 1.0 MPa. After the ignition process the starter burner is extinguished and dismantled. Faults in the gasification process cause the fuel burners to be shut down and the reactors to be depressurized.

The object underlying the invention is to create a process for the operation of entrained flow gasification plants which by continued operation of a pilot and ignition burner after start-up of the combination burner or, in the case of a multi-burner arrangement, of the production burners and by introducing a selectively configured fail-safe monitoring system makes it unnecessary to depressurize the reactors in order to restart them after a fault in fuel gasification.

The object is achieved by a method with the features of the independent claims.

In accordance with the invention, by selectively configuring the fail-safe monitoring of the gasification process only the main fuel supply is switched off. Through the continued operation of the pilot and ignition burner the reactor is kept at operating pressure and once the fault has been rectified fuel gasification can be restarted using the pilot and ignition burner without a complicated placement and pulling of a starter burner and subsequent pressurization of the reactors. While guaranteeing technical safety and a short start-up time, the invention permits the operation of autothermic partial oxidation of fuels processed as pulverized fuels such as lignite and bituminous coals, petroleum cokes, solid grindable carbon-containing residues, as well as solid-liquid suspensions or slurries, with a gasification agent containing oxygen at operating pressures of up to 8 MPa (80 bar).

Advantageous configurations of the subject matter of the application are presented in the subclaims.

BRIEF DESCRIPTION OF THE DRAWINGS

In the following the subject matter of the application is explained in more detail as an exemplary embodiment to an extent required for understanding with reference to figures, in which.

DETAILED DESCRIPTION OF INVENTION

Figure 1:
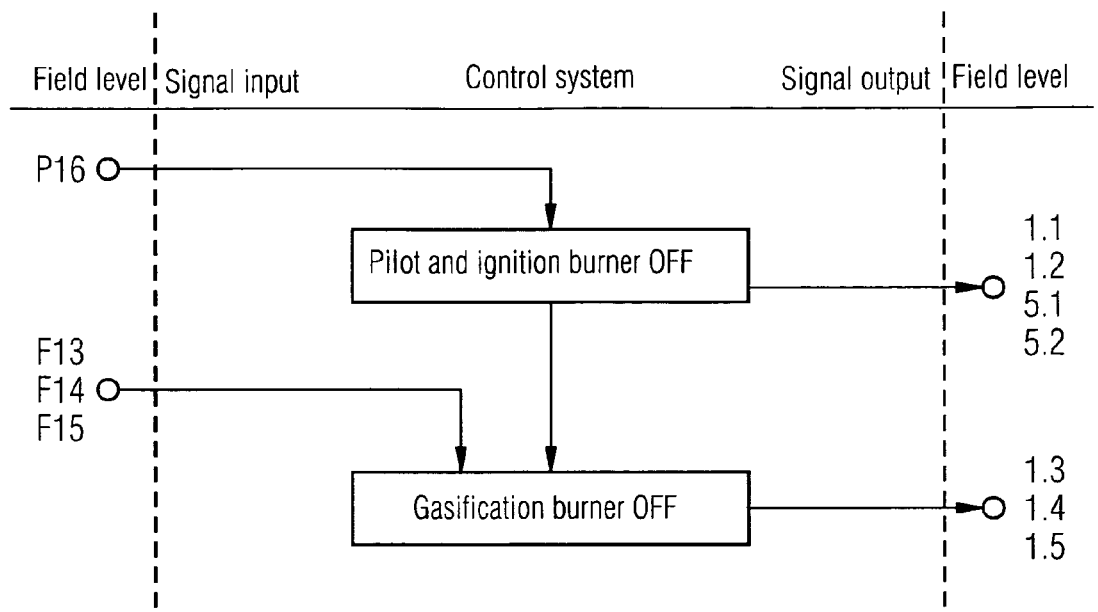
FIG. 1 shows a block diagram of selective safety-related monitoring.
Figure 2:
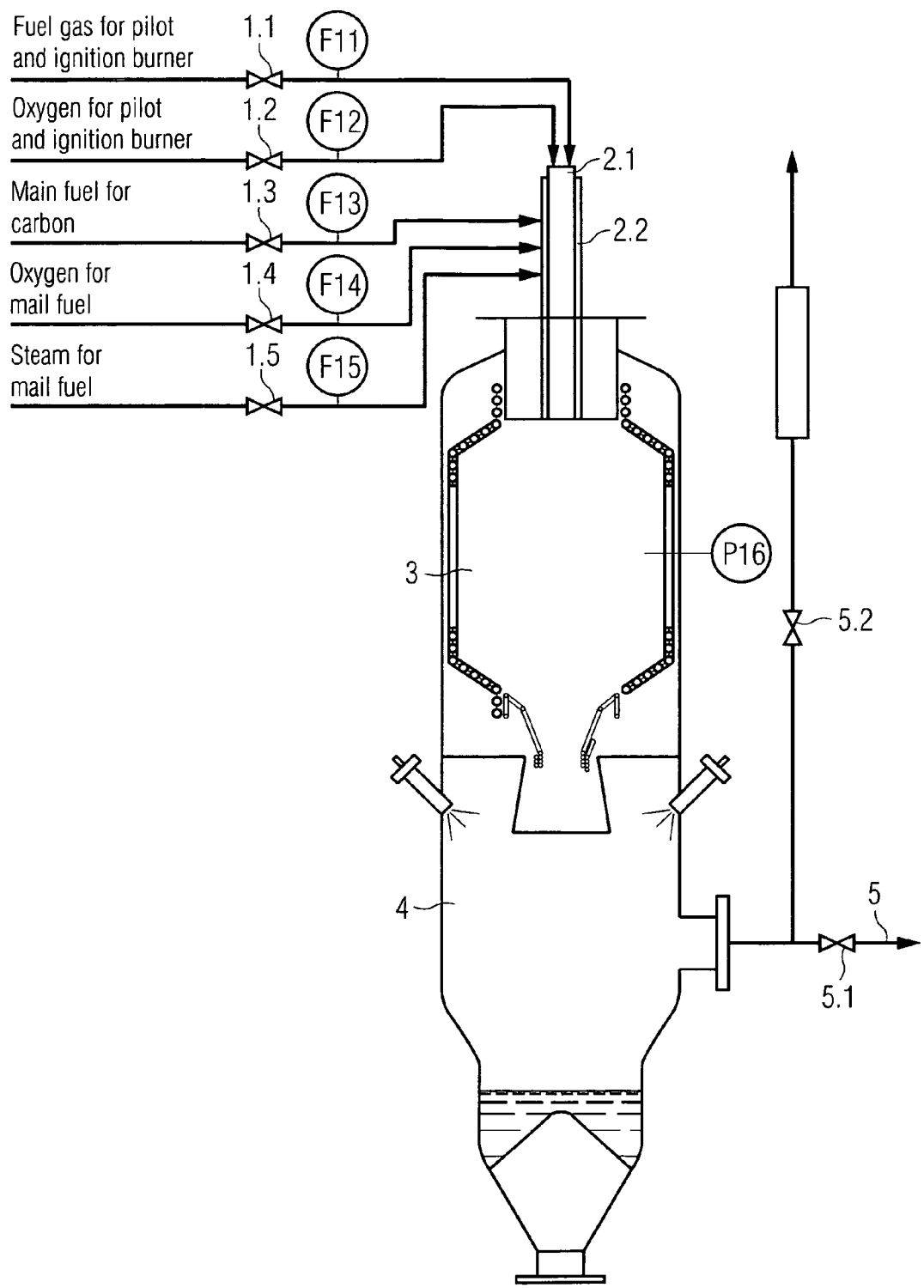
FIG. 2 shows a gasification reactor with media supply, burner, quenching and raw gas removal.

In accordance with the invention the selective fail-safe monitoring of the gasification process for high-power reactors is provided as follows:

The fuel burners are started by means of an ignition and pilot burner at gasifier operating pressure, therefore at pressures of up to 8 MPa (80 bar).

As a prerequisite for the introduction of selective monitoring the centrally arranged pilot and ignition burner remains in operation with a minimal load after the fuel burners have been started. Preferably the power of the ignition and pilot burner is 1% of the nominal load.

The gasification plant's fail-safe control system (FSC), which is necessary for safe operation of the gasification process, is divided into two levels with regard to the parameters to be monitored and the control actions to be triggered on recognition of a fault—the operation of fuel gasification and the operation of the pilot and ignition burner.

On recognition of a fault in the fuel gasification operation only the fuel gasification process is shut down, i.e. the incoming and outgoing media streams for fuel gasification are safely disconnected from the reactor. The pilot and ignition burner itself remains in operation, so that the reactor does not have to be depressurized in order to restart the fuel burners. After the fault or operational irregularity has been rectified fuel gasification is started by means of the ignition and pilot burner, without a complicated reheating or placement of a starter burner and subsequent pressurization.

If a fault occurs which is relevant for the temperature and pressure stability of the equipment and thus also for the safety of the operating personnel, the entire process switches to safe mode, i.e. the gasification burners and pilot and ignition burner are shut down, all incoming and outgoing media are safely turned off and the reactor is depressurized.

In a gasification reactor 3 85 t/h of coal is to be gasified at a pressure of 4 MPa (40 bar). The fuels and the gasification agents oxygen and steam are supplied by means of the combination burner 2 to the reactor 3, in which gasification takes place at approx. 1450° C. The combination burner comprises a centrically arranged, gas-fired ignition and pilot burner 2.1 and the actual gasification burner 2.2. The raw gas produced flows together with the liquid slag into the quencher 4. By spraying water in excess the raw gas is cooled to approx. 215° C. and is saturated with steam. The slag drops into the water bath in the quencher sump and granulates. The cooled raw gas leaves the quencher 4 from the side and flows into the subsequent gas network 5.

The gasification process is monitored by means of a superordinate fail-safe control system. The latter's selective configuration into levels or stages is to be described with reference to the example of volume measurements in the media supply lines 1 and of the reactor pressure P16.

If during fuel gasification operation a fault occurs in the supply of the main fuel coal or the gasification agents oxygen and steam which leads to a deviation in the monitored quantities F13-F15 greater than the permissible fault tolerance, the gasification burner 2.2 is shut down by the selective fail-safe control system which closes the shutoff valves 1.3-1.5. The shutoff valves 1.1 and 1.2 in the supply lines to the ignition and pilot burner 2.1 stay open, however, so that the ignition and pilot burner remains in operation with 1500 m3N/h of combustion gas and the reactor can be kept in standby mode at 40 bar in order to reignite the gasification burner after the fault has been rectified.

If owing to a fault in the gas path during gasification the pressure rises in the reactor 3, monitored by means of the pressure measuring point P16, the selective fail-safe control system firstly turns off the gasification burner 2.2 by closing the valves 1.3-1.5 in order to protect the equipment from exceeding the permissible pressure. After the irregularity has been rectified, the gasification burner is restarted with the ignition and pilot burner 2.1, which has remained in operation. If the pressure continues to rise even though the gasification burner has been turned off, the control system closes the valves 1.1 and 1.2 in the media supply to also turn off the ignition and pilot burner 2.1 and reduces the pressure in the reactor 3 and quencher 4 by closing the gas discharge valve 5.1 and opening the pressure-relief valve 5.2 in order to protect the equipment and the operating personnel.

The invention includes a method for the selective safety-related monitoring of high-power entrained-flow gasification reactors with a single- or multi-burner arrangement for the autothermic partial oxidation of fuels processed into pulverized fuel such as lignite and bituminous coals, petroleum cokes, solid grindable carbon-containing residues, as well as solid-liquid suspensions or slurries, with a gasification agent containing oxygen at operating pressures of up to 80 bar, whereby a monitoring system of the gasification process configured in two levels is integrated in the control system to ensure safe operation of the reactors.

In a further embodiment of the method the control system for monitoring the operation of the reactors is configured as a fail-safe control system.

In a further embodiment of the method the background logic of the control system is designed in such a way that the fuel gasification measuring points, which incorporate a monitoring function, respond to a fault signal by starting a sequence which only shuts down the fuel gasification process. This shutdown sequence contains all the safety-related and technologically necessary steps to disconnect the incoming and outgoing media streams from the reactor. The ignition and pilot burners remain in operation and keep the reactors in standby mode.

In a further embodiment of the method, if a fault is recognized which can potentially lead to the design of the equipment being exceeded in terms of pressure and temperature and which is therefore relevant for the safety of the operating personnel, a second shutdown sequence not only stops the fuel gasification process but also turns off the ignition and pilot burner by safely stopping the flow of all media and ensures that the plant is safe by depressurizing the reactor.

The solution is designed in such a way that if a fault occurs which triggers the shutdown sequence for the ignition and pilot burner the sequence to shutdown fuel gasification is likewise started by means of logic connection.

In a further embodiment of the method the fuel burners are started up at operating pressure, whereby after the fuel burners have been started up the pilot and ignition burner remains in operation at minimal power and the power of the ignition and pilot burner is limited to 1% of the fuel burners' nominal load.

The invention claimed is:

1. A method for the selective safety-related monitoring of high-power entrained-flow gasification reactors with single- or multi-burner arrangement for the autothermic partial oxidation of fuels processed into pulverized fuel, with a gasification agent containing oxygen at operating pressures of up to 80 bar, comprising:
   integrating a gasification process monitoring system in a control system for the safe operation of the reactors, the gasification process monitoring system configured in two levels,
   wherein the first level ensures the monitoring and control of the fuel burner,
   wherein the second level the ignition, monitoring and control of the ignition and pilot burner,
   wherein when a fault that endangers the equipment is recognized the method further comprises initiating a second shutdown sequence,
   wherein the second shutdown sequence shuts down the ignition and pilot burner in addition to stopping the fuel gasification process, the second shutdown sequence includes safely disconnecting all media and ensures that the plant is safe by depressurizing the system,
   wherein when a fault occurs which triggers the shutdown sequence for the ignition and pilot burner the sequence for stopping the fuel gasification process is likewise started by logic connections, and
   wherein faults that endanger the equipment pertain to pressure and temperature exceeding limit values.

2. The method as claimed in claim 1, wherein the control system is configured such that the fuel gasification measuring points, which incorporate a monitoring function, respond to a fault signal by starting a sequence which only stops the fuel gasification process, wherein the ignition and pilot burner remains in operation under process conditions.

3. The method as claimed in claim 1, wherein the control system for monitoring the operation of the reactors is configured as a fail-safe control system.

4. The method as claimed in claim 1,
   wherein fuel burners are started up at an operating pressure, and
   wherein after the fuel burners have been started up the pilot and ignition burner remains in operation with a minimal power of 1% of a nominal load.

5. The method as claimed in claim 1, wherein for controlling an entrained-flow gasification reactor for the autothermic partial oxidation of ash-forming main fuels with a free oxygen-containing gasification agent at operating pressures of up to 8 MPa and gasification temperatures of between 1,200 and 1,900° C., in which
   the supply of the fuel for the ignition and pilot burner is controllable,
   the supply of the gasification agent for the ignition and pilot burner is controllable,
   the supply of the main fuel to the fuel burner is measurable and controllable, the supply of the gasification agent for the main fuel to the fuel burner is measurable and controllable, and the supply of the steam for the main fuel to the fuel burner is measurable and controllable, wherein the ignition and pilot burner remains in operation during regular gasification operation of the fuel burner, and wherein a deviation in the measured quantities greater than the permissible fault tolerance from its specified value within the fuel gasification operation is identified, only the supply of the main fuel to the fuel burner, the supply of the gasification agent for the main fuel to the fuel burner, and the supply of the steam for the main fuel to the fuel burner are cut off.

6. The method as claimed in claim 5, wherein pulverized fuel are used as the main fuel.

7. The method as claimed in claim 5, wherein solid-liquid suspensions or slurries are used as the main fuel.

8. The method as claimed in claim 5, wherein when critical parameters are exceeded not only the supply of the main fuel, the supply of the gasification agent for the main fuel, the supply of the steam for the main fuel to the fuel burner are cut off but also the supply of the fuel and of the gasification agent for the ignition and pilot burner are cut off.

9. The method as claimed in claim 8, wherein the critical parameter pertains to pressure in the reaction chamber of the reactor.

10. The method as claimed in claim 8, wherein the critical parameter pertains to temperature in the reaction chamber of the reactor.

11. The method as claimed in claim 6, wherein fuels processed into pulverized fuel such as lignite and bituminous coals, petroleum cokes and solid grindable carbon-containing residues are used as the main fuel.

12. A method for the selective safety-related monitoring of high-power entrained-flow gasification reactors with single- or multi-burner arrangement for the autothermic partial oxidation of fuels processed into pulverized fuel, with a gasification agent containing oxygen at operating pressures of up to 80 bar, comprising:

integrating a gasification process monitoring system in a control system for the safe operation of the reactors, the gasification process monitoring system configured in two levels, wherein the first level ensures the monitoring and control of the fuel burner, wherein the second level the ignition, monitoring and control of the ignition and pilot burner, wherein for controlling an entrained-flow gasification reactor for the autothermic partial oxidation of ash-forming main fuels with a free oxygen-containing gasification agent at operating pressures of up to 8 MPa and gasification temperatures of between 1,200 and 1,900° C., in which the supply of the fuel for the ignition and pilot burner is controllable, the supply of the gasification agent for the ignition and pilot burner is controllable, the supply of the main fuel to the fuel burner is measurable and controllable, the supply of the gasification agent for the main fuel to the fuel burner is measurable and controllable, and the supply of the steam for the main fuel to the fuel burner is measurable and controllable, wherein the ignition and pilot burner remains in operation during regular gasification operation of the fuel burner, and wherein a deviation in the measured quantities greater than the permissible fault tolerance from its specified value within the fuel gasification operation is identified, only the supply of the main fuel to the fuel burner, the supply of the gasification agent for the main fuel to the fuel burner, and the supply of the steam for the main fuel to the fuel burner are cut off, wherein when critical parameters are exceeded not only the supply of the main fuel, the supply of the gasification agent for the main fuel, the supply of the steam for the main fuel to the fuel burner are cut off but also the supply of the fuel and of the gasification agent for the ignition and pilot burner are cut off, and wherein the critical parameter pertains to pressure in the reaction chamber of the reactor.

\* \* \* \* \*